(12) United States Patent
Saegusa et al.

(10) Patent No.: US 10,027,747 B2
(45) Date of Patent: Jul. 17, 2018

(54) TERMINAL COMMUNICATION APPARATUS, AND DISTRIBUTED CONTROL SYSTEM

(71) Applicant: HITACHI HIGH-TECHNOLOGIES CORPORATION, Tokyo (JP)

(72) Inventors: Takashi Saegusa, Hitachi (JP); Ikuo Takemura, Kumagaya (JP); Hideyuki Kamasuka, Kumagaya (JP); Masahiro Koyama, Hitachi (JP); Terunobu Funatsu, Hitachi (JP)

(73) Assignee: HITACHI HIGH-TECHNOLOGIES CORPORATION, Tokyo (JP)

( * ) Notice: Subject to any disclaimer, the term of this patent is extended or adjusted under 35 U.S.C. 154(b) by 559 days.

(21) Appl. No.: 14/596,604

(22) Filed: Jan. 14, 2015

(65) Prior Publication Data

US 2015/0127707 A1 May 7, 2015

Related U.S. Application Data

(63) Continuation of application No. PCT/JP2013/068174, filed on Jul. 2, 2013.

(30) Foreign Application Priority Data

Jul. 20, 2012 (JP) ................................. 2012-161346

(51) Int. Cl.
*G06F 15/16* (2006.01)
*H04L 29/08* (2006.01)
(Continued)

(52) U.S. Cl.
CPC .......... *H04L 67/1095* (2013.01); *G05B 15/02* (2013.01); *G05B 19/4148* (2013.01);
(Continued)

(58) Field of Classification Search
CPC ................ G05B 19/4148; G05B 15/02; G05B 2219/34406; G05B 2219/34413; H04L 67/1095
See application file for complete search history.

(56) References Cited

U.S. PATENT DOCUMENTS

| | | | |
|---|---|---|---|
| 2002/0041595 A1* | 4/2002 | Delvaux ................. | H04L 47/10 370/392 |
| 2004/0081175 A1* | 4/2004 | Wall ........................ | H04L 45/34 370/397 |

(Continued)

FOREIGN PATENT DOCUMENTS

| | | |
|---|---|---|
| JP | 2000-183913 A | 6/2000 |
| JP | 2009-060480 A | 3/2009 |
| JP | 2009-111838 A | 5/2009 |

OTHER PUBLICATIONS

International Search Report; PCT/JP2013/068174; dated Aug. 13, 2013.

*Primary Examiner* — Cheikh Ndiaye
(74) *Attorney, Agent, or Firm* — Studebaker & Brackett PC

(57) ABSTRACT

A terminal communication apparatus has a terminal communication control portion rendering an immediate communication control portion sequentially transmitting serial data to another terminal communication apparatus bitwise when receiving a packet as bitwise serial data and a normal communication control portion performing processing on the packet after accumulating the serial data until the serial data reaches a packet length when receiving the bitwise serial data switchable, performing processing with the immediate communication control portion in a case of receiving a time adjustment packet containing time adjustment data posting a timing of synchronization in the other terminal communication apparatus and performing process- (Continued)

ing with the normal communication control portion in a case of receiving a packet other than the time adjustment packet. Thus, synchronization of control object devices can be enabled without previously investigating communication delay times.

5 Claims, 12 Drawing Sheets

(51) Int. Cl.
  *G05B 19/414* (2006.01)
  *G05B 15/02* (2006.01)
(52) U.S. Cl.
  CPC .............. *G05B 2219/34406* (2013.01); *G05B 2219/34413* (2013.01)

(56) References Cited

U.S. PATENT DOCUMENTS

| | | | | |
|---|---|---|---|---|
| 2008/0279289 | A1* | 11/2008 | Karaki | G06F 13/4291 375/257 |
| 2009/0019129 | A1* | 1/2009 | Suzuki | H04N 5/23203 709/208 |
| 2009/0074122 | A1* | 3/2009 | Huang | H04L 7/02 375/358 |
| 2009/0310489 | A1* | 12/2009 | Bennett | G06F 13/4278 370/236 |
| 2010/0274934 | A1* | 10/2010 | Nakayama | G06F 13/4295 710/33 |

* cited by examiner

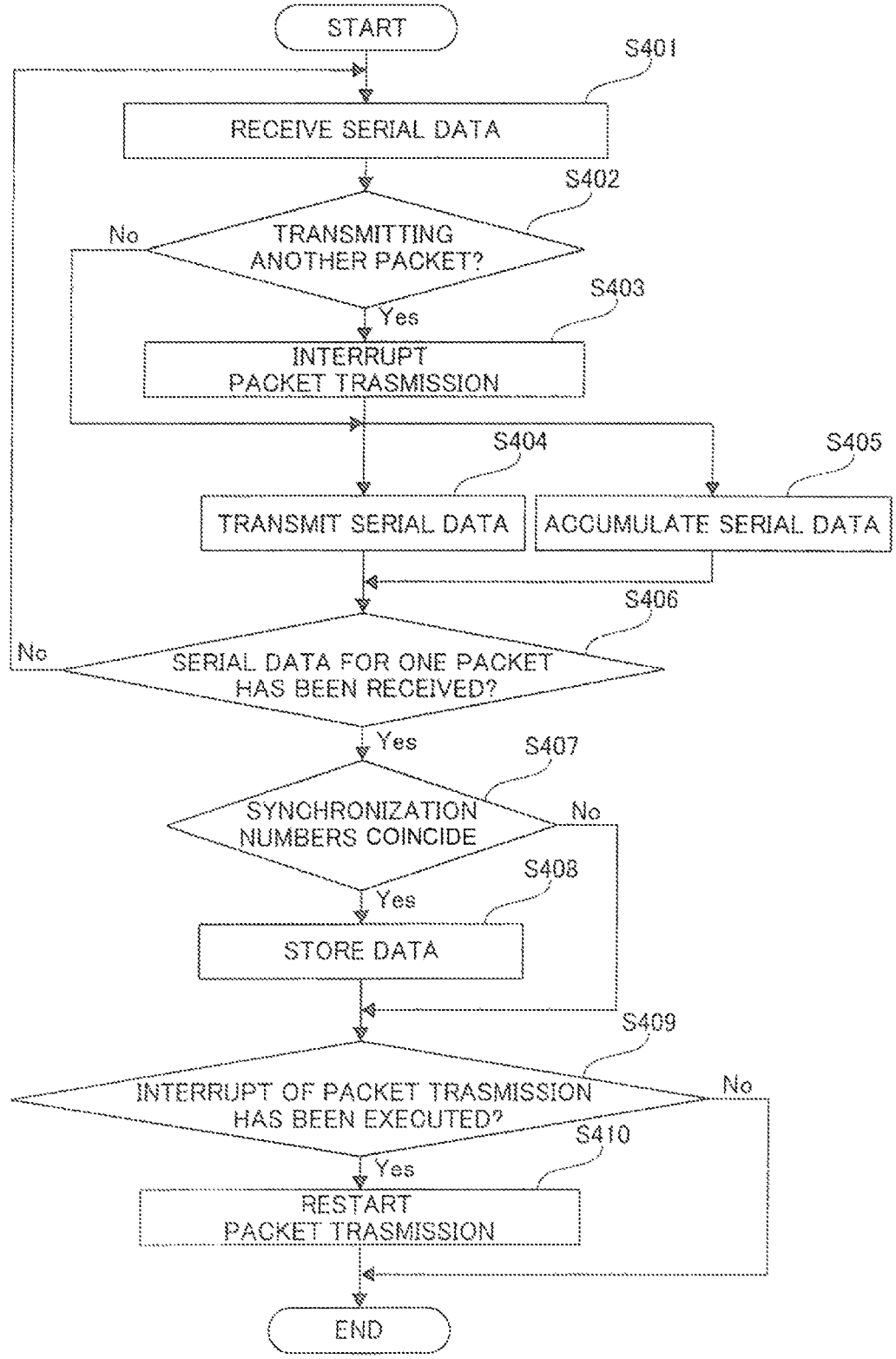

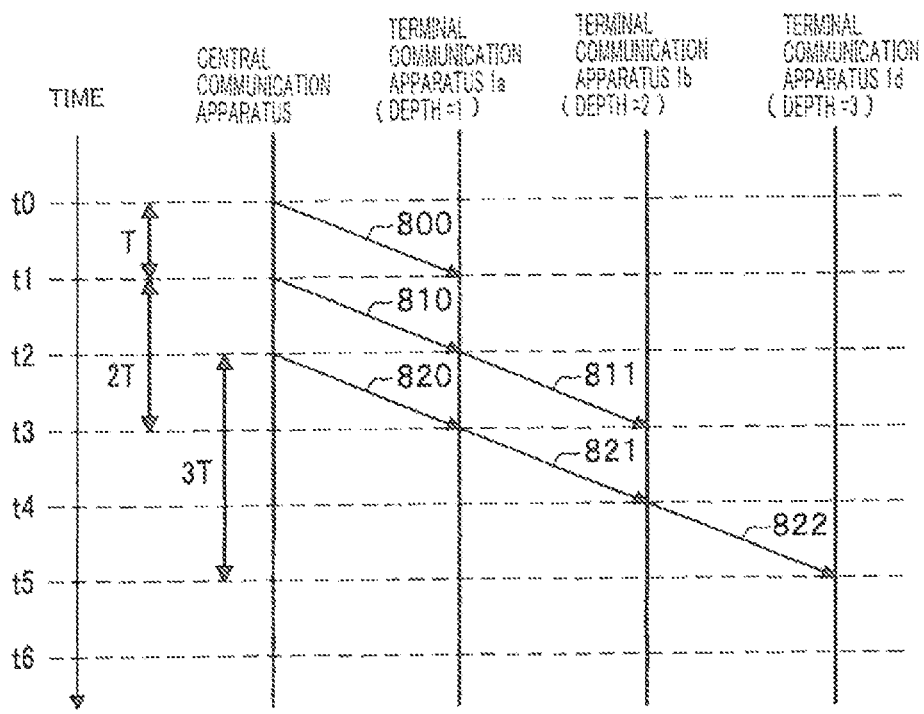
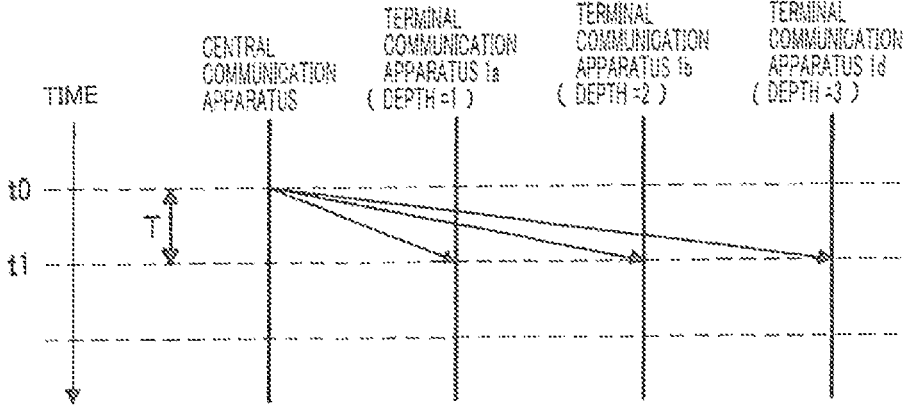

TERMINAL COMMUNICATION APPARATUS, AND DISTRIBUTED CONTROL SYSTEM

CROSS REFERENCE TO RELATED APPLICATIONS

This application claims benefit of priority to Japanese Patent Application No. 2012-161346 filed on Jul. 20, 2012, and to International Patent Application No. PCT/JP2013/068174 filed Jul. 2, 2013, the entire content of each of which is incorporated herein by reference.

TECHNICAL FIELD

The present technical field relates to a terminal communication apparatus and a distributed control system each connecting control object devices incorporated into an industrial machine or the like with each other and controlling these.

BACKGROUND

In recent years, a control system connecting various control object devices with each other through a network has been employed, in order to attain wiring saving. Particularly in an industrial machine, a distributed control system connecting drivers driving motors of respective shafts constituting a driving system thereof and input/output devices included in peripheral units with each other through a network and controlling these control object devices is employed.

It is known that such a distributed control system is constituted of a central communication apparatus unifying the whole sequence and a plurality of terminal communication apparatuses executing input/output control to/from control object devices such as sensors and actuators. The central communication apparatus and the respective terminal communication apparatuses are connected with each other through communication lines in a mode such as a multidrop mode or a daisy-chain mode, whereby a network is constituted.

In the distributed control system, the central communication apparatus and the terminal communication apparatuses transmit/receive control information for the control object devices and sensor input information to/from each other through such a network, thereby executing control of the control object devices.

Ring-type and bus-type connection modes according to the multidrop mode are frequently employed for the network of such a distributed control system, and these connection modes have such advantages that communication control is easy and construction of the network is also easy.

At present, however, the number of control object devices required for an industrial machine increases following high functionalization and high performance of the industrial machine, and large scaling progresses also for the system.

In application of the distributed control system to such a large-scale system, restriction of the connection mode is remarkable in a network of the multidrop mode or the like, and the structure of the system is extremely complicated.

In order to solve such a problem, a technique of simplifying multipoint connection by constituting a tree-type network according to point-to-point connection for improving the degree of freedom in the connection mode of the network is conceivable. In such a network, however, a communication delay time varies with the connection mode (hierarchy) of the network, and hence synchronous control of inputs/outputs in a plurality of control object devices becomes difficult.

In a conventional distributed control system, it is necessary to uniformly perform communication in response to exhibiting highest performance and also in a case where different control cycles are required to respective ones of a plurality of synchronous control operations on the same network. An excessive communication speed is required for the network in order to correctly guarantee these different control cycles in the conventional distributed control system, and hence execution of strict synchronous control is difficult.

With respect to such a problem, a technique described in Japanese Patent Laying-Open No. 2009-60480 is disclosed, for example. A field control system described in Japanese Patent Laying-Open No. 2009-60480 senses delays in control processing, and collects measurement result packets to which time stamps of respective field devices are added. Then, this field control system grasps communication delay times between the respective field devices on the basis of the time stamps. Further, the field control system adjusts operation schedules of the respective field devices in response to these communication delay times.

SUMMARY

In the field control system described in Japanese Patent Laying-Open No. 2009-60480, however, there is a problem that a terminal communication apparatus (terminator) collecting the communication delay times is newly required. Further, the field control system described in Japanese Patent Laying-Open No. 2009-60480 must collect the communication delay times, and must transmit packets therefor in addition to normal communication. Thus, there is a problem that the maximum communication capacity possessed by a network decreases and the communication performance of the network is lowered.

The present disclosure has been proposed in consideration of such a background, and the present disclosure aims at enabling synchronization of control object devices without previously investigating communication delay times.

In order to solve the aforementioned problem, the present disclosure is characterized in having a terminal communication control portion rendering an immediate communication control portion sequentially transmitting serial data to another terminal communication apparatus bitwise when receiving data of a prescribed length as bitwise serial data and a normal communication control portion performing processing on the data after accumulating the serial data until the serial data reaches the prescribed length when receiving the bitwise serial data switchable, performing processing with the immediate communication control portion in a case of receiving first data which is data of the prescribed length at least containing time adjustment data posting a timing of synchronization in the other terminal communication apparatus, and performing processing with the normal communication control portion in a case of receiving second data which is data of the prescribed length other than the first data.

According to the present disclosure, synchronization of control object devices can be enabled without previously investigating communication delay times.

BRIEF DESCRIPTION OF THE DRAWINGS

FIG. 7 is a flowchart showing the procedure of immediate communication control according to this embodiment.

FIG. 8 is a diagram showing circumstances of communication by normal communication control according to this embodiment.

FIG. 9 is a diagram showing circumstances of communication by immediate communication control according to this embodiment.

DETAILED DESCRIPTION

Figure 1:
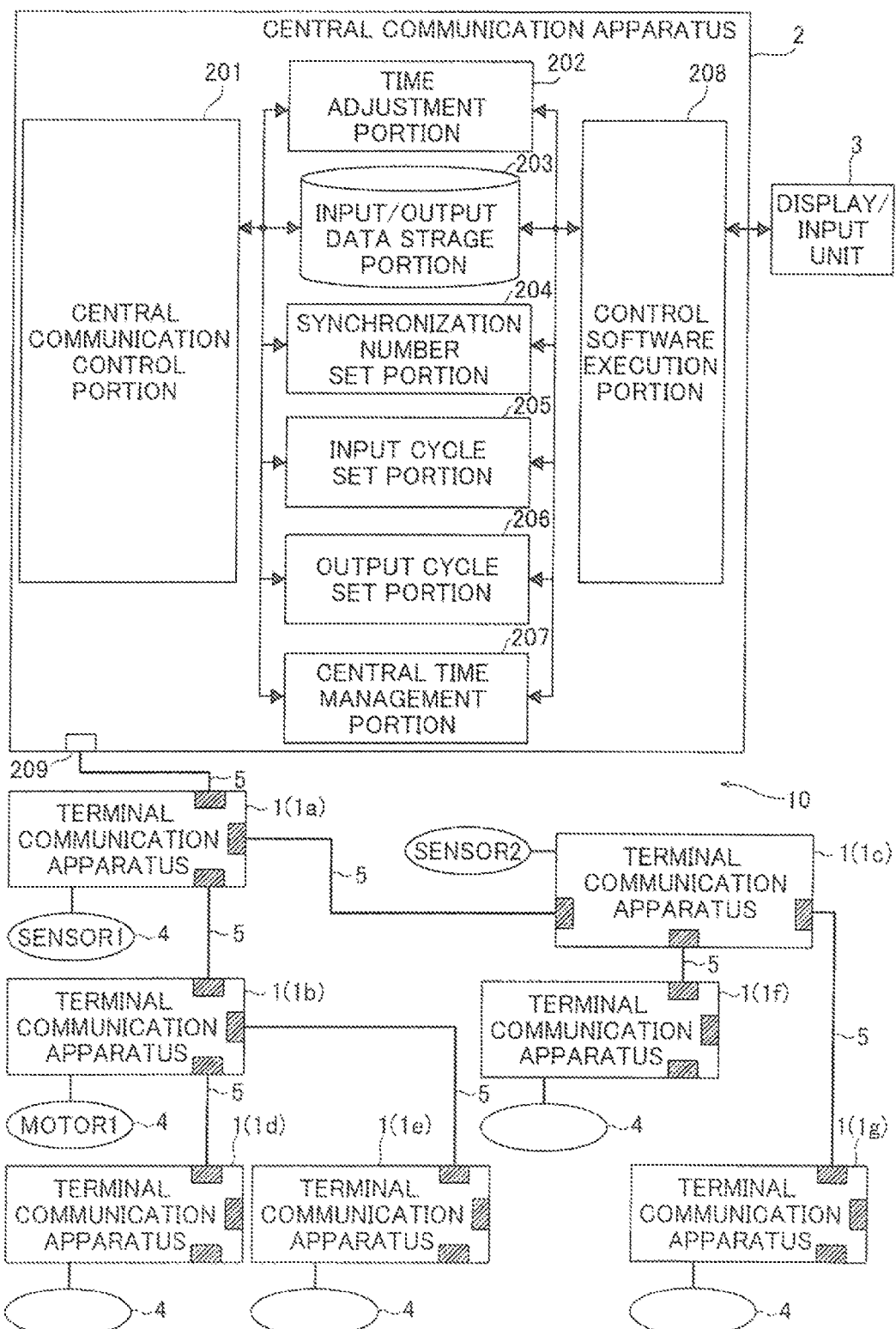
FIG. 1 is a diagram showing a structural example of a distributed control system according to this embodiment.

A mode (referred to as "embodiment") for carrying out the present disclosure is now described in detail while properly referring to the drawings.

Distributed Control System

FIG. 1 is a diagram showing a structural example of a distributed control system according to this embodiment.

A distributed control system 10 has a central communication apparatus 2, and has a plurality of terminal communication apparatuses 1 (1a to 1g) controlling control object devices 4. The central communication apparatus 2 and the respective ones of the terminal communication apparatuses 1 are connected with each other through communication paths 5, whereby a network is constituted. Details of each terminal communication apparatus 1 are described later.

Central Communication Apparatus

The central communication apparatus 2, to which a display/input unit 3 such as a keyboard/display is connected, has a central communication control portion 201, a time adjustment portion 202, an input/output data storage portion 203, a synchronization number set portion 204, an input cycle set portion 205, an output cycle set portion 206, a central time management portion 207 and a control software execution portion 208.

The central communication control portion 201 performs transmission/receiving of data to/from the terminal communication apparatuses 1 through the network.

The time adjustment portion 202 performs adjustment of times (synchronization times etc.) managed by the terminal communication apparatuses 1 through communication of the network.

Input/output control data with respect to the terminal communication apparatuses 1 are stored in the input/output data storage portion 203.

The synchronization number set portion 204 sets synchronization numbers for synchronization-grouping the terminal communication apparatuses 1 on the basis of information or the like input through the display/input unit 3 or the like, and sets synchronization groups to the terminal communication apparatuses 1 through a communication circuit.

The input cycle set portion 205 performs setting of input cycles of control information in the terminal communication apparatuses 1 on the basis of information or the like input through the display/input unit 3 or the like.

The output cycle set portion 206 performs setting of output cycles of the control information in the terminal communication apparatuses 1 on the basis of information or the like input through the display/input unit 3 or the like.

The central time management portion 207 performs management of data transmission times in the central communication control portion 201.

The control software execution portion 208 unifies control of the control object devices 4 by the terminal communication apparatuses 1.

The central communication apparatus 2 has at least one downstream-side communication port 209.

In this embodiment, it is assumed that the side of the central communication apparatus 2 is referred to as an upstream side in the network, and the side of the terminal communication apparatuses 1 is referred to as a downstream side.

Terminal Communication Apparatus

Figure 2:
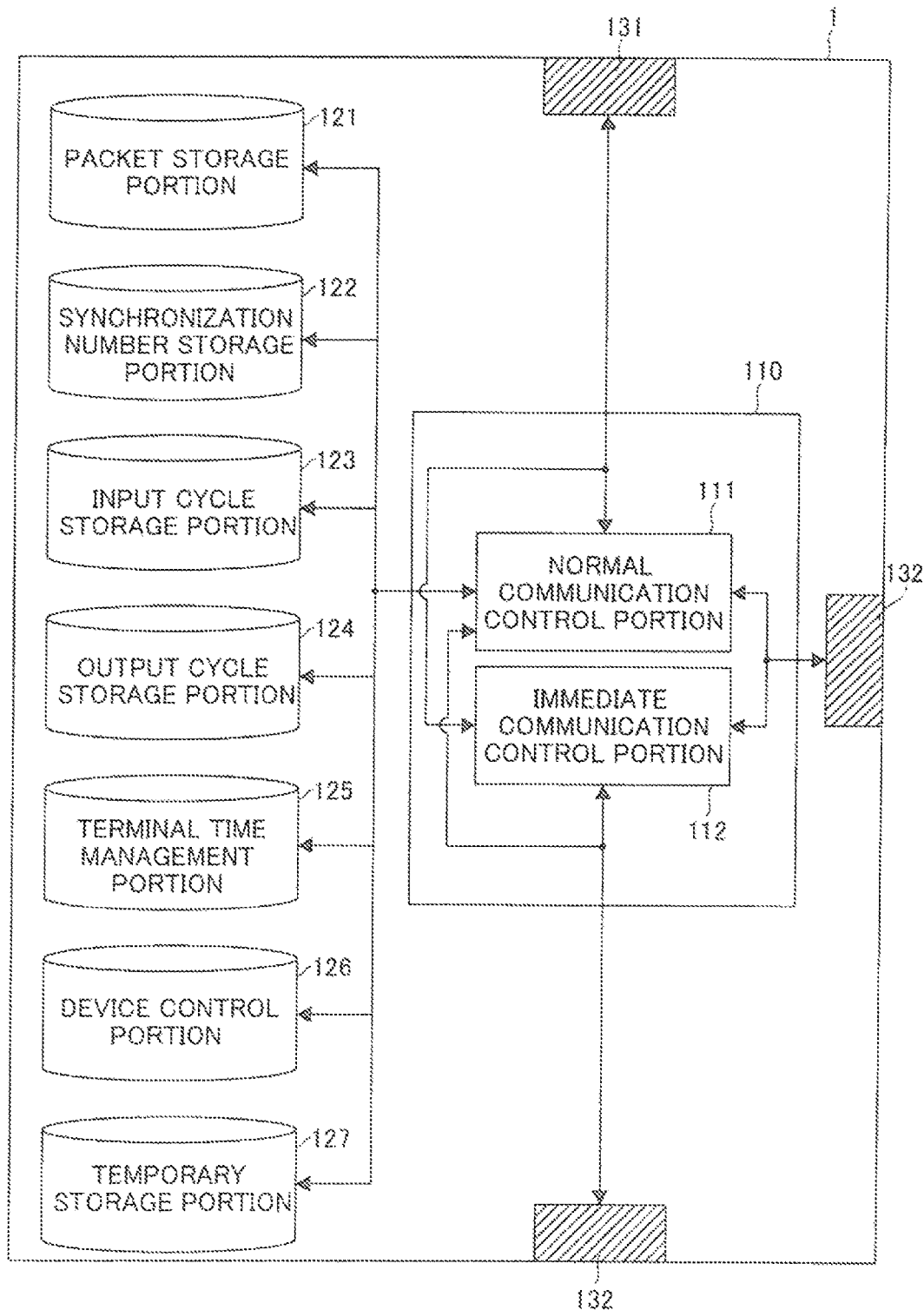
FIG. 2 is a diagram showing a structural example of a terminal communication apparatus according to this embodiment.

FIG. 2 is a diagram showing a structural example of each terminal communication apparatus according to this embodiment.

The terminal communication apparatus 1 has a terminal communication control portion 110 which is a control portion, a packet storage portion 121, a synchronization number storage portion 122, an input cycle storage portion 123, an output cycle storage portion 124, a terminal time management portion 125, a device control portion 126, a temporary storage portion 127, at least one upstream-side communication port 131 and one or more downstream-side communication ports 132.

The terminal communication control portion 110 performs transmission/receiving of data to/from the central communication apparatus 2 through the network, and further performs processing responsive to the type of the packet which is data of the prescribed length.

The packet storage portion 121 stores the packet which is a combination of data received through the network and communication control data.

A synchronization number set in the central communication apparatus 2 is stored in the synchronization number storage portion 122.

Input cycle data which is data of an input cycle of control information set in the central communication apparatus 2 is stored in the input cycle storage portion 123.

Output cycle data which is data of an output cycle of the control information set in the central communication apparatus 2 is stored in the output cycle storage portion 124.

The terminal time management portion 125 performs counting and management of the time.

The device control portion 126 executes control of the control object device 4 connected to itself on the basis of the control information stored in the received packet. For example, the device control portion 126 performs input/output control of the control object device 4 connected to itself. At this time, the device control portion 126 executes input control of input control data at a cycle based on the input cycle data stored in the input cycle storage portion 123 with reference to the time managed by the terminal time management portion 125.

Further, the device control portion 126 executes output control of output control data at a cycle based on the output cycle data stored in the output cycle storage portion 124 with reference to the time managed by the terminal time management portion 125.

Data received bitwise as serial data are accumulated in the temporary storage portion 127 until the same reach data for a packet. The serial data are those obtained by dividing the data of the packet bitwise.

The terminal communication control portion 110 has a normal communication control portion 111 performing normal communication control described later in FIG. 6 and an immediate communication control portion 112 performing immediate communication control described later in FIG. 7.

Whole Processing

Figure 3A:
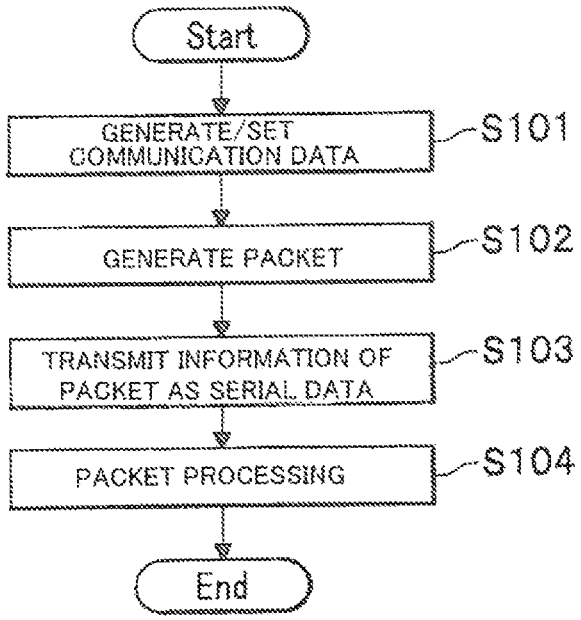
FIG. 3A is a flowchart showing the procedure of communication processing in a downstream direction in communication processing according to this embodiment.

FIG. 3A is a flowchart showing the procedure of communication processing in a downstream direction in communication according to this embodiment.

First, operations at a time when communication from the central communication apparatus 2 to the terminal communication apparatus 1 (hereinafter referred to as the downstream direction) is performed.

First, the control software execution portion 208 of the central communication apparatus 2 generates communication data to be transmitted, and sets the communication data for every type of the communication data (S101).

At this time, the types of the generated communication data and set destinations thereof are as follows:

(a1) Output control data to the control object device 4 is stored in the input/output data storage portion 203.

(a2) Time adjustment data, which is information for time adjustment, posting a timing of synchronization between the terminal communication apparatuses 1 is set in the time adjustment portion 202.

(a3) The synchronization number identifying the synchronization group is set in the synchronization set portion 204.

(a4) The input cycle data indicating the input cycle of the control information is set in the input cycle set portion 205.

(a5) The output cycle data indicating the output cycle of the control information is set in the out cycle set portion 206.

The central communication control portion 201 of the central communication apparatus 2 generates the packet (S102), and transmits the generated packet as serial data, i.e., transmits the information of the packet to the network bitwise through the downstream-side communication port 209 (S103).

At this time, the type of each transmitted packet is as follows:

(b1) An output control packet generated/transmitted on the basis of the data stored in the input/output data storage portion 203.

(b2) A time adjustment packet generated/transmitted on the basis of the time adjustment data set in the time adjustment portion 202. The time adjustment packet is generated/transmitted at the timing of synchronization in the terminal communication apparatus 1.

(b3) A synchronization number set packet generated/transmitted on the basis of the synchronization number set in the synchronization number set portion 204. The synchronization number set packet is generated/transmitted at a timing (timing generally started by the terminal communication apparatus 1) for setting the synchronization group in the terminal communication apparatus 1.

(b4) An input cycle set packet generated/transmitted on the basis of the input cycle data set in the input cycle set portion 205. The input cycle set packet is generated/transmitted at a timing for setting the input cycle in the terminal communication apparatus 1.

(b5) An output cycle set packet generated/transmitted on the basis of the output cycle data set in the output cycle set portion 206. The output cycle set packet is generated/transmitted at a timing for setting the output cycle in the terminal communication apparatus 1.

The terminal communication control portion 110 of the terminal communication apparatus 1 receiving each transmitted packet performs packet processing for every type of the received packet (S104). While the processing at the step S104 is described later, a summary of the processing for every packet is as follows:

(c1) In a case where the received packet is the output control packet, the terminal communication control portion 110 sets the output control data stored in the output control packet to the device control portion 126 when the destination of the packet is itself. In a case where the destination of the packet is not itself, the terminal communication control portion 110 transfers the output control packet to other terminal communication apparatuses 1 from all of the downstream-side communication ports 132.

(c2) In a case where the received packet is the time adjustment packet, the terminal communication control portion 110 sets the time adjustment data stored in the output control packet to the terminal time management portion 125 when the destination of the packet is itself. In a case where the destination of the packet is not itself, the terminal communication control portion 110 transfers the time adjustment packet to other terminal communication apparatuses 1 from all of the downstream-side communication ports 132.

(c3) In a case where the received packet is the synchronization number set packet, the terminal communication control portion 110 stores the synchronization number stored in the synchronization number set packet in the synchronization number storage portion 122 when the destination of the packet is itself. In a case where the destination of the packet is not itself, the terminal control communication portion 110 transfers the synchronization number set packet to other terminal communication apparatuses from all of the downstream-side communication ports 132.

(c4) In a case where the received packet is the input cycle set packet, the terminal communication control portion 110 stores the input cycle data stored in the input cycle packet in the input cycle storage portion 123 when the destination of the packet is itself. In a case where the destination of the packet is not itself, the terminal control communication portion 110 transfers the input cycle set packet to other terminal communication apparatuses 1 from all of the downstream-side communication ports 132.

(c5) In a case where the received packet is the output cycle set packet, the terminal communication control portion 110 stores the output cycle data stored in the output cycle set packet in the output cycle storage portion 124 when the destination of the packet is itself. In a case where the destination of the packet is not itself, the terminal control communication portion 110 transfers the output cycle set packet to other terminal communication apparatuses 1 from all of the downstream-side communication ports 132.

Figure 3B:
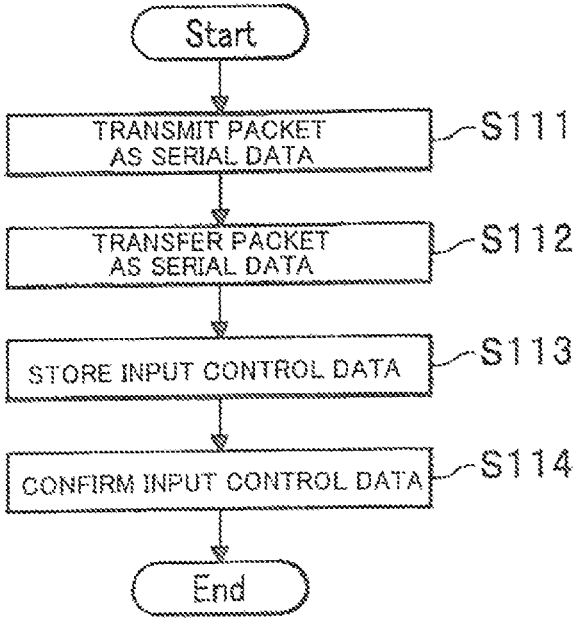
FIG. 3B is a flowchart showing the procedure of communication processing in an upstream direction in the communication processing according to this embodiment.

FIG. 3B is a flowchart showing the procedure of communication processing in the upstream direction in the communication according to this embodiment.

Operations at a time when communication from the terminal communication apparatus 1 to the central communication apparatus 2 (hereinafter referred to as the upstream direction) are now described.

First, when the device control portion 126 of the terminal communication apparatus 1 acquires input control data from the control object device 4, the same generates an input control packet storing the acquired input control data in a data body portion 405 (FIG. 4), and the terminal communication control portion 110 transmits the generated input control packet from the upstream-side communication port 131 to the network as serial data (S111).

The terminal communication control portion 110 of the terminal communication apparatus 1 receiving the input control packet from the downstream terminal communication apparatus 1 through any one of the downstream-side communication ports 132 transfers the received input control packet to the network through the upstream-side communication port 131 as the serial data (S112).

The central communication control portion 201 of the central communication apparatus 2 receiving the input control packet through the downstream-side communication port 209 stores the input control data stored in the received input control packet in the input/output data storage portion 203 (S113).

The control software execution portion 208 of the central communication apparatus 2 confirms input control data from all terminal communication apparatuses 1 by referring to the input control data stored in the input/output data storage portion 203 (S114).

Each terminal communication apparatus 1 executes normal communication control and immediate communication control depending on the types of packets received by communication in the downstream direction and communication in the upstream direction. While details of the normal communication control and the immediate communication control are described later, summaries of those are as follows:

In the normal communication control, the terminal communication control portion 110 performs packet transfer after receiving a packet received through the upstream-side communication port 131 or a packet received through any downstream-side communication port 132 entirely as one packet. "Normal" indicates that the terminal communication apparatus 1 is performing no immediate communication control.

In the immediate communication control, on the other hand, the terminal communication control portion 110 transfers a packet received through the upstream-side communication port 131 or a packet received through any downstream-side communication port 132 to the immediate communication control portion 112 as serial data. In other words, the immediate communication control portion 112 transfers the transferred serial data to the network sequentially bitwise, without waiting for accumulation of one packet.

Packet Structure

Figure 4:
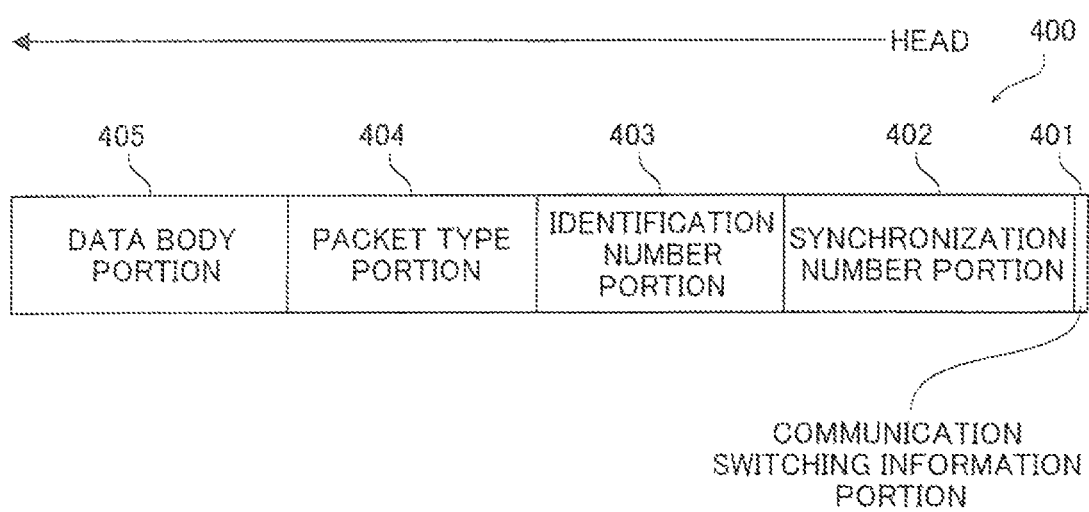
FIG. 4 is a diagram showing an example of a packet structure according to this embodiment.

FIG. 4 is a diagram showing an example of a packet structure according to this embodiment.

A packet 400 has a communication switching information portion 401, a synchronization number portion 402, an identification number portion 403, a packet type portion 404 and the data body portion 405 from the head. The packet 400 is read in an arrow direction of FIG. 4 from the headmost communication switching information portion 401.

The communication switching information 401 has communication switching information which is information as to whether to perform the normal communication control described later in FIG. 6 or to perform the immediate communication control described later in FIG. 7. The communication switching information portion 401 is desirably constituted of one bit, so that "0" is stored when the normal communication control is performed and "1" is stored when the immediate communication control is performed, for example.

The synchronization number which is an individual number supplied every synchronization group in each terminal communication apparatus 1 is stored in the synchronization number portion 402.

An identification number which is information of the destination from the central communication apparatus 2 to one terminal communication apparatus 1 in communication of the network and the sender from one terminal communication apparatus 1 to the central communication apparatus 2 is stored in the identification number portion 403.

Type information (packet type information) of the packet indicating the type (input/output control data, input cycle data or the like) of the data is stored in the packet type portion 404.

The data body portion 405 stores a data body.

In this embodiment, it is assumed that the packet is transmitted/received as serial data having the communication switching information portion 401 as the head in the communication through the network.

Further, it is assumed that the packet type information stored in the packet type portion 404 is information corresponding to the type of the packet, such as "10" when the data body stored in the data body portion 405 is the input/output control data or "30" when the same is the input cycle data, for example. The terminal communication portion 110 transfers the data body stored in the data body portion 405 to the device control portion 126, the input cycle storage portion 123 or the like on the basis of this packet type information.

While the communication switching information stored in the communication switching information portion 401 is desirably one bit as described above, the same may be other than one bit.

Processing of Terminal Communication Control Portion

Figure 5:
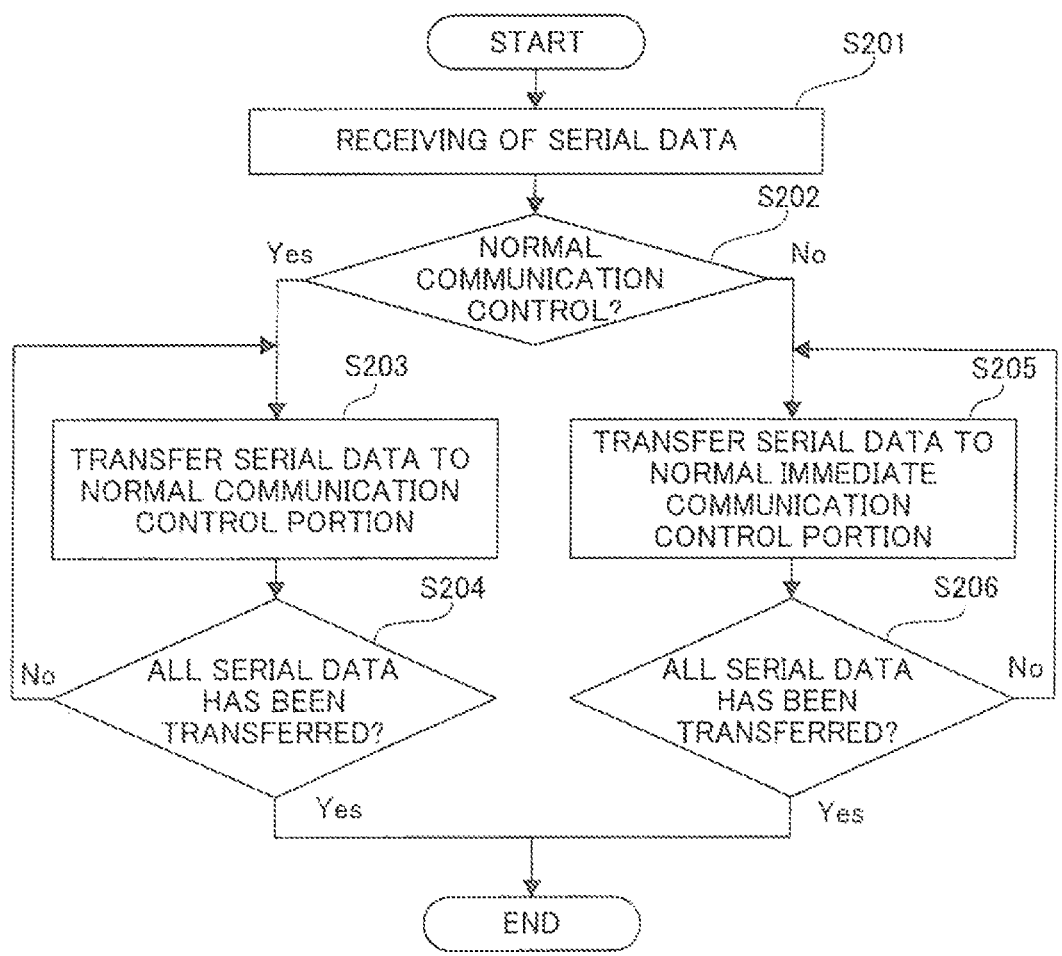
FIG. 5 is a flowchart showing the procedure of processing in a terminal communication control portion according to this embodiment.

FIG. 5 is a flowchart showing the procedure of processing in the terminal communication control portion according to this embodiment.

First, the terminal communication control portion 110 receives the packet converted to the serial data for one bit from another terminal communication apparatus 1 or the central communication apparatus 2 (receiving of serial data: S201).

Data of the first one bit in the packet is the communication switching information as shown in FIG. 4, and hence the terminal communication control portion 110 determines whether or not the communication switching information is the normal communication control with reference to the received data for one bit (S202).

In a case where the communication switching information is the normal communication control (S202→Yes) as a result of the step S202, the terminal communication control portion 110 sequentially transfers the received packet to the normal communication control portion 111 bitwise as the serial data (transfer the serial data to the normal communication control portion 111: S203), and determines whether or not the serial data for one packet has been entirely transferred (all serial data has been transferred) to the normal communication control portion 111 (S204).

In a case of not entirely transferring the serial data (S204→No) as a result of the step S204, the terminal communication control portion 110 returns the processing to the step S203.

In a case of entirely transferring the serial data (S204→Yes) as a result of the step S204, the terminal communication control portion 111 terminates the processing.

In a case where the communication switching information is not the normal communication control (S202→No), i.e., the same is the immediate communication control as a result of the step S202, the terminal communication control portion 110 transfers the received packet to the immediate communication control portion 112 as the serial data bitwise (transfer the serial data to the immediate communication control portion 112: S205), and determines whether or not the serial data for one packet has been entirely transferred to the immediate communication control portion 112 (all serial data has been transferred: S206).

In a case of not entirely transferring the serial data (S206→No) as a result of the step S206, the terminal communication control portion 110 returns the processing to the step S205.

In a case of entirely transferring the serial data (S206→Yes) as a result of the step S206, the terminal communication control portion 110 terminates the processing.

Processing by Normal Communication Control Portion

Figure 6:
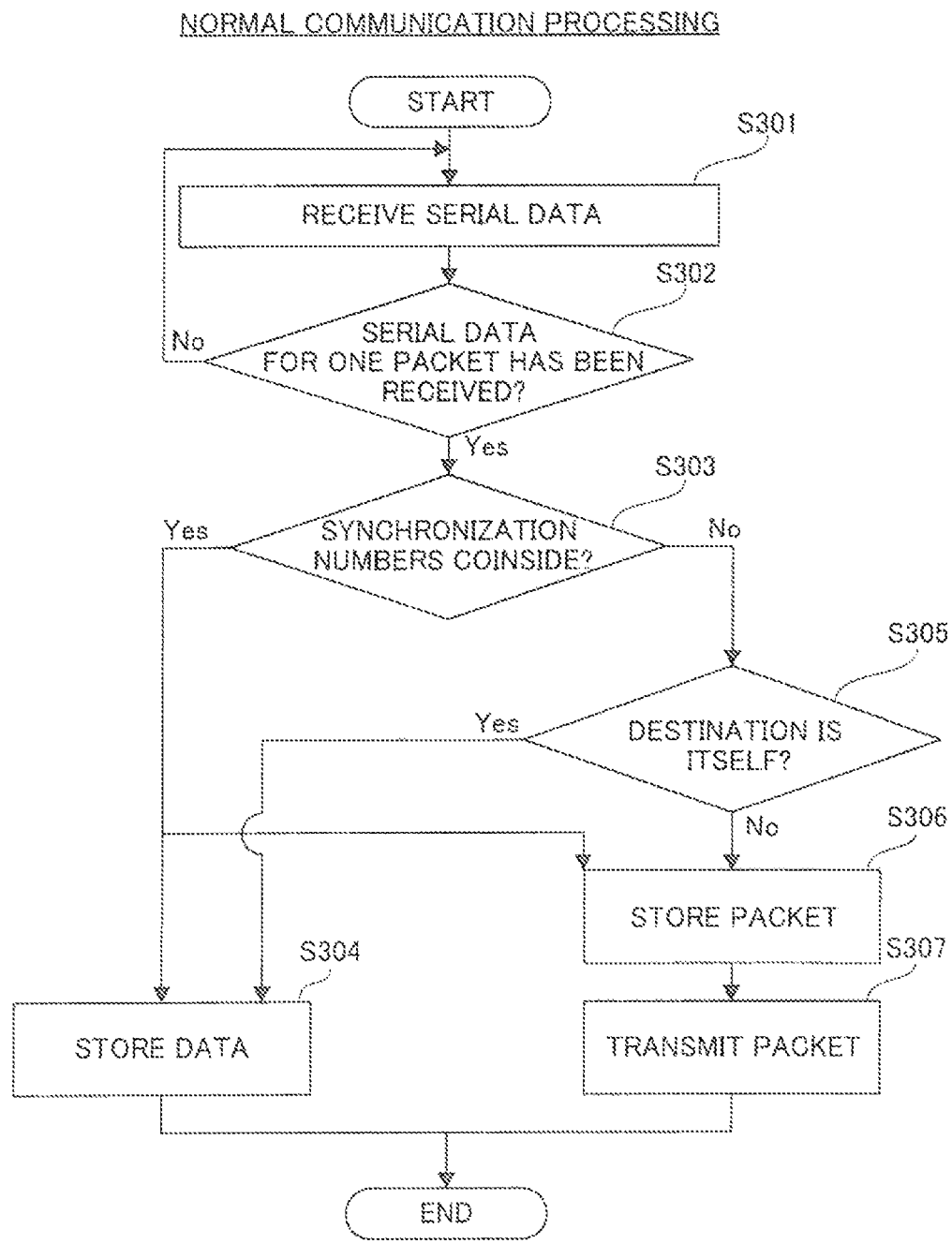
FIG. 6 is a flowchart showing the procedure of normal communication control according to this embodiment.

FIG. 6 is a flowchart showing the procedure of the normal communication control according to this embodiment.

The normal communication control portion 111 receives the serial data transmitted by the terminal communication control portion 110 at the step S203 of FIG. 5 bitwise (S301), and accumulates the received serial data in the temporary storage portion 127.

Then, the normal communication control portion 111 determines whether or not the serial data for one packet (i.e., for a packet length which is the prescribed length) has been received (S302).

In a case of not receiving the serial data for one packet (S302→No) as a result of the step S302, the normal communication control portion 111 returns the processing to the step S301.

In a case of receiving the serial data for one packet (S302→Yes) as a result of the step S302, the normal communication control portion 111 determines whether or not the synchronization number in the synchronization number information coincides with the synchronization number stored in the synchronization number storage portion 122 of itself with reference to the synchronization number portion 402 (FIG. 4) of the received packet (S303). In other words, the normal communication control portion 111 determines whether or not the received packet is addressed to the synchronization group to which the same belongs.

In a case where the synchronization numbers coincide with each other (S303→Yes) as a result of the step S303, the normal communication control portion 111 stores the data of the data body portion 405 (FIG. 4) of the packet in the storage portion corresponding to the type of the received packet with reference to the packet type portion 404 (FIG. 4) of the received packet (S304), and terminates the processing.

At this time, the normal communication control portion 111 stores the packet in the packet storage portion 121 (S306) in parallel with the processing at the step S304, transmits the packet stored in the packet storage portion 121 to another terminal communication apparatus 1 or the central communication apparatus 2 through the upstream-side communication port 131 or any downstream-side communication port 132 (S307), and terminates the processing.

In a case where the synchronization numbers do not coincide with each other (S303→No) as a result of the step S303, the normal communication control portion 111 determines whether or not the destination of the packet is itself with reference to the identification number portion 403 (FIG. 4) of the received packet (S305).

In a case where the destination of the packet is itself (S305→Yes) as a result of the step S305, the normal communication control portion 111 performs the processing at the step S304 thereby storing the information of the data body portion 405 of the packet in the storage portion corresponding to the type of the received packet (S304), and terminates the processing.

In a case where the destination of the packet is not itself (S305→No) as a result of the step S305, the normal communication control portion 111 performs the processing at the step S306 thereby storing the packet in the packet storage portion 121, transmits the received packet to another terminal communication apparatus 1 or the central communication apparatus 2 through the upstream-side communication port 131 or any downstream-side communication port 132 (S307), and terminates the processing.

Processing by Immediate Communication Control Portion

FIG. 7 is a flowchart showing the procedure of the immediate communication control according to this embodiment.

When receiving the serial data transmitted by the terminal communication control portion 111 at the step S205 of FIG. 5 (S401), the immediate communication control portion 112 determines whether or not the normal communication control portion 111 is currently transmitting another packet by referring to the communication state of the upstream-side communication port 131 or each downstream-side communication port 132 (S402).

In a case where the normal communication control portion 111 is transmitting another packet (S402→Yes) as a result of the step S402, the immediate communication control portion 112 makes the packet storage portion 121 store the packet being transmitted by the normal communication control portion 111, and thereafter makes the normal communication control portion 111 interrupt the transmission of the packet (S403).

In a case where the normal communication control portion 111 is not transmitting another packet (S402→No) as a result of the step S402, or after the processing at the step S403 is completed, the immediate communication control portion 112 transmits the serial data received at the step S401 to another terminal communication control portion 110 or the central communication apparatus 2 through the upstream-side communication port 131 in a case of communication to the upstream direction or through any downstream-side communication port 132 in a case of communication to the downstream direction sequentially bitwise (S404). In other words, the immediate communication control portion 112 transmits the serial data received at the step S401 to another terminal communication control portion 110 or the central communication apparatus 2 as such at the step S404. At this time, the immediate communication control portion 112 transmits the serial data to another terminal communication control portion 110 or the central communication apparatus 2, no matter whether the packet originating the serial data is addressed to itself or not.

Further, the immediate communication control portion 112 accumulates the serial data received at the step S401 in the temporary storage portion 127 in parallel with the processing at the step S404 (S405).

Then, the immediate communication control portion 112 determines whether or not the serial data for one packet (i.e., for the packet length which is the prescribed length) has been received (S406).

In a case of not receiving the serial data for one packet (S406→No) as a result of the step S406, the immediate communication control portion 112 returns the processing to the step S401.

In a case of receiving the serial data for one packet (S406→Yes) as a result of the step S406, the immediate communication control portion 112 determines whether or not the synchronization number in the synchronization number portion 402 coincides with the synchronization number stored in the synchronization number storage portion 122 of itself with reference to the synchronization number portion 402 (FIG. 4) of the received packet (S407). In other words, the immediate communication control portion 112 determines whether or not the received packet is addressed to the group to which the same belongs.

In a case where the synchronization numbers coincide with each other (S407→Yes) as a result of the step S407, the immediate communication control portion 112 stores the data of the data body portion 405 (FIG. 4) of the packet in the storage portion corresponding to the type of the packet with reference to the packet type portion 404 (FIG. 4) of the packet (S408).

In a case where the synchronization numbers do not coincide with each other (S407→No) as a result of the step S407, or after completion of the step S408, the immediate communication control portion 112 determines whether or not interruption of packet transmission has been executed at the step S403 (S409).

In a case of not executing the interruption of the packet transmission (S409→No) as a result of the step S409, the immediate communication control portion 112 terminates the processing.

In a case of executing the interruption of the packet transmission (S409→Yes) as a result of the step S409, the immediate communication control portion 112 restarts the packet transmission (step S410) by making the normal communication control portion 111 transmit the packet (packet whose transmission has been interrupted) stored in the packet storage portion 121 through the communication port through which the packet has been transmitted, and terminates the processing.

Applied Example

An applied example of the distributed control system according to this embodiment is now described with reference to FIGS. 8 to 11.

FIG. 8 is a diagram showing circumstances of communication by the normal communication control according to this embodiment.

The circumstances of the communication shown in FIG. 8 are also circumstances of communication in the general distributed control system 10. Further, signs of terminal communication apparatuses 1a, 1b and 1d are based on FIG. 1.

Here, "depth" denotes the number of connections from the central communication apparatus 2.

For example, the terminal communication apparatus 1a of "depth=1" is the terminal communication apparatus 1a connected to the central communication apparatus 2 (see FIG. 1. The terminal communication apparatus 1b of "depth=2" is the terminal communication apparatus 1b connected to the terminal communication apparatus 1 of "depth=1" (see FIG. 1). Further, a terminal communication apparatus 1 of "depth=3" is the terminal communication apparatus 1d connected to the downstream side of the terminal communication apparatus 1 of "depth=2" (see FIG. 1).

First, the central communication apparatus 2 transmits a packet to the terminal communication apparatus 1a of "depth=1" by normal communication control at a time "t0" (communication 800). Assuming that a communication delay time applied to one communication path 5 is T [seconds] at this time, transmission of the packet according to the communication 800 takes T [seconds]. To be exact, a time when data of one bit transmits through the communication path 5 is ignorably small, while it takes T [seconds] so that serial data for one packet is accumulated in the terminal communication apparatus 1a.

Then, the central communication apparatus 2 performs transmission of a packet to the terminal communication apparatus 1b of "depth=2" by normal communication control at a time "t1" (communication 810, 811).

At this time, the terminal communication apparatus 1a of "depth=1" first temporarily receives (accumulates) the packet transmitted through the communication 810, and the terminal communication apparatus 1a thereafter transmits the packet transmitted through the communication 811 to the terminal communication apparatus 1b of "depth=2".

Therefore, a communication delay time in the packet transmission from the central communication apparatus 2 to the terminal communication apparatus 1b is 2T [seconds].

Further, the central communication apparatus 2 transmits a packet to the terminal communication apparatus 1d of "depth=3" by normal communication control at a time "t2" (communication 820, 821 and 822).

At this time, the terminal communication apparatus 1a of "depth=1" first temporarily receives (accumulates) the packet transmitted through the communication 820. Thereafter the terminal communication apparatus 1a transmits the packet to the terminal communication apparatus 1b of "depth=2", and the terminal communication apparatus 1b temporarily receives (accumulates) the packet (communication 821). Then, the terminal communication apparatus 1b transmits the packet to the terminal communication apparatus 1d of "depth=3" (communication 822).

Therefore, a communication delay time in the packet transmission from the central communication apparatus 2 to the terminal communication apparatus 1d is 3T [seconds].

FIG. 9 is a diagram showing circumstances of communication by immediate communication control according to this embodiment.

It is assumed that the relation between the central communication apparatus 2 and the terminal communication apparatuses 1a, 1b and 1d is similar to that in FIG. 8.

It is assumed that the terminal communication apparatuses 1a, 1b and 1d are in the same synchronization group (in other words, the same synchronization number is stored in the synchronization number storage portions 122). It is also assumed that the central communication apparatus 2 sets the synchronization number of the synchronization group as the destination of the communication and transmits a packet (here, data of time adjustment for synchronization is stored in the data body portion 405 (FIG. 4)).

First, the central communication apparatus 2 transmits the packet to the terminal communication apparatuses 1a, 1b and 1*d* as serial data at a time "t0". The terminal communication apparatus 1*a* receiving the serial data of the packet immediately transmits the serial data of the received packet to the terminal communication apparatus 1*b*. In other words, the terminal communication apparatus 1*a* transmits the serial data to the terminal communication apparatus 1*b* sequentially bitwise while accumulating the same when receiving the serial data of the packet. In other words, the terminal communication apparatus 1*a* transmits the serial data without waiting for accumulation of the serial data for one packet, and hence no communication delay time for the accumulation arises.

Therefore, a communication delay time in the terminal communication apparatus 1*b* of "depth=2" is also T [seconds] identical to a communication delay time in the terminal communication apparatus 1*d* of "depth=1". Incidentally, the transmission time for data of one bit is ignorably small as described above, and hence a time in which the serial data is accumulated for the packet in each of the terminal communication apparatuses 1*a* and 1*b* is T [seconds].

For a similar reason, a communication delay time in the terminal communication apparatus 1*d* of "depth=3" can also be set to T [seconds].

Thus, the communication delay times from the central communication apparatus 2 to the terminal communication apparatuses 1*a*, 1*b* and 1*d* uniformly reach T [seconds] by using the immediate communication control according to this embodiment.

Figure 10:
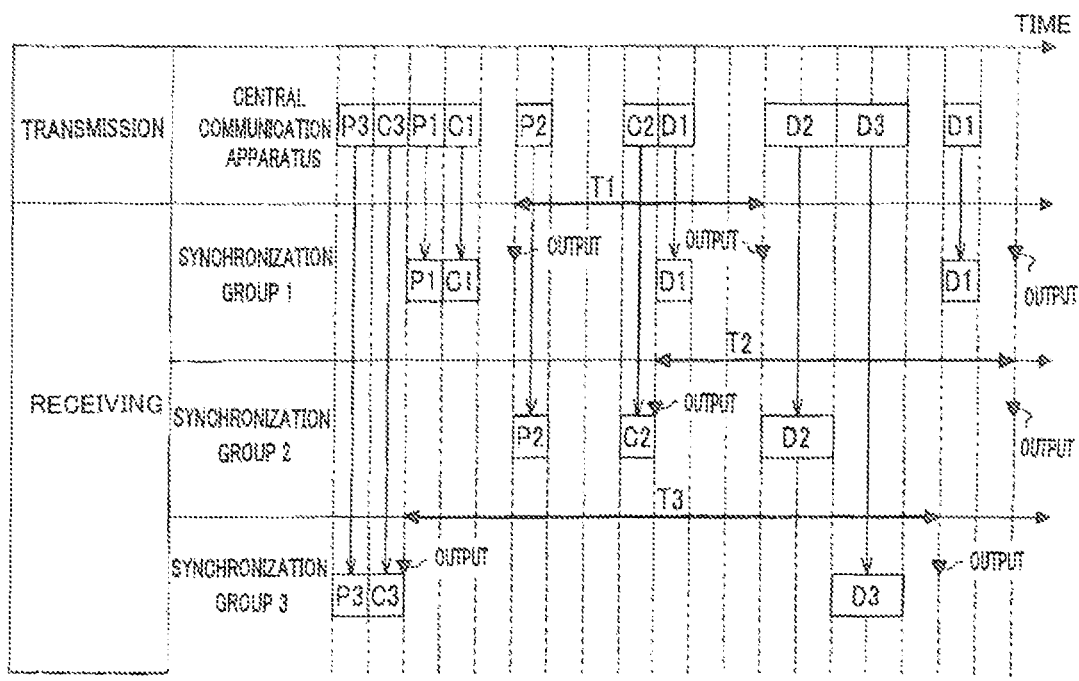
FIG. 10 is a diagram showing communication states in respective synchronization groups according to this embodiment.

FIG. 10 is a diagram showing communication states in respective synchronization groups according to this embodiment.

Referring to FIG. 10, it is assumed that synchronization groups of terminal communication apparatuses 1 executing synchronous control are synchronization groups "1" to "3", an output cycle required to the synchronization group is "P1 (=T1)", an output cycle required to the synchronization group "2" is "P2 (=T2)", and an output cycle required to the synchronization group "3" is "P3 (=T3)".

At this time, the central communication apparatus 2 transmits output cycle set packets in which data of the output cycles "P1" to "P3" are stored in the data body portions 405 (FIG. 4) to the terminal communication apparatuses 1 of the respective synchronization groups at timings shown in FIG. 10. The terminal communication apparatuses 1 receiving these packets set the output cycles of the respective synchronization groups. These output cycle set packets are transmitted by normal communication control.

Then, the central communication apparatus 2 transmits time adjustment packets ("C1" to "C3") for performing synchronization to the terminal communication apparatuses 1 of the respective synchronization groups at timings shown in FIG. 10. These time adjustment packets are transmitted by immediate communication control. Therefore, the time adjustment packets are substantially simultaneously received by the respective terminal communication apparatuses 1 in the same synchronization groups, for the reason described in FIG. 9. The respective terminal communication apparatuses 1 receiving the time adjustment packets perform synchronization by performing resetting of timers or the like.

The central communication apparatus 2 periodically transmits such time adjustment packets so that the times of the respective terminal communication apparatuses 1 do not deviate from each other.

Further, the central communication apparatus 2 transmits output control packets ("D1" to "D3") varying with the terminal communication apparatuses 1 to the terminal communication apparatuses 1 in the respective synchronization groups at timings shown in FIG. 10. The output control packets are transmitted by normal communication control.

"Outputs" in FIG. 10 are output responses from the control object devices 4 (these cycles become the aforementioned output cycles "P1" to "P3").

Figure 11:
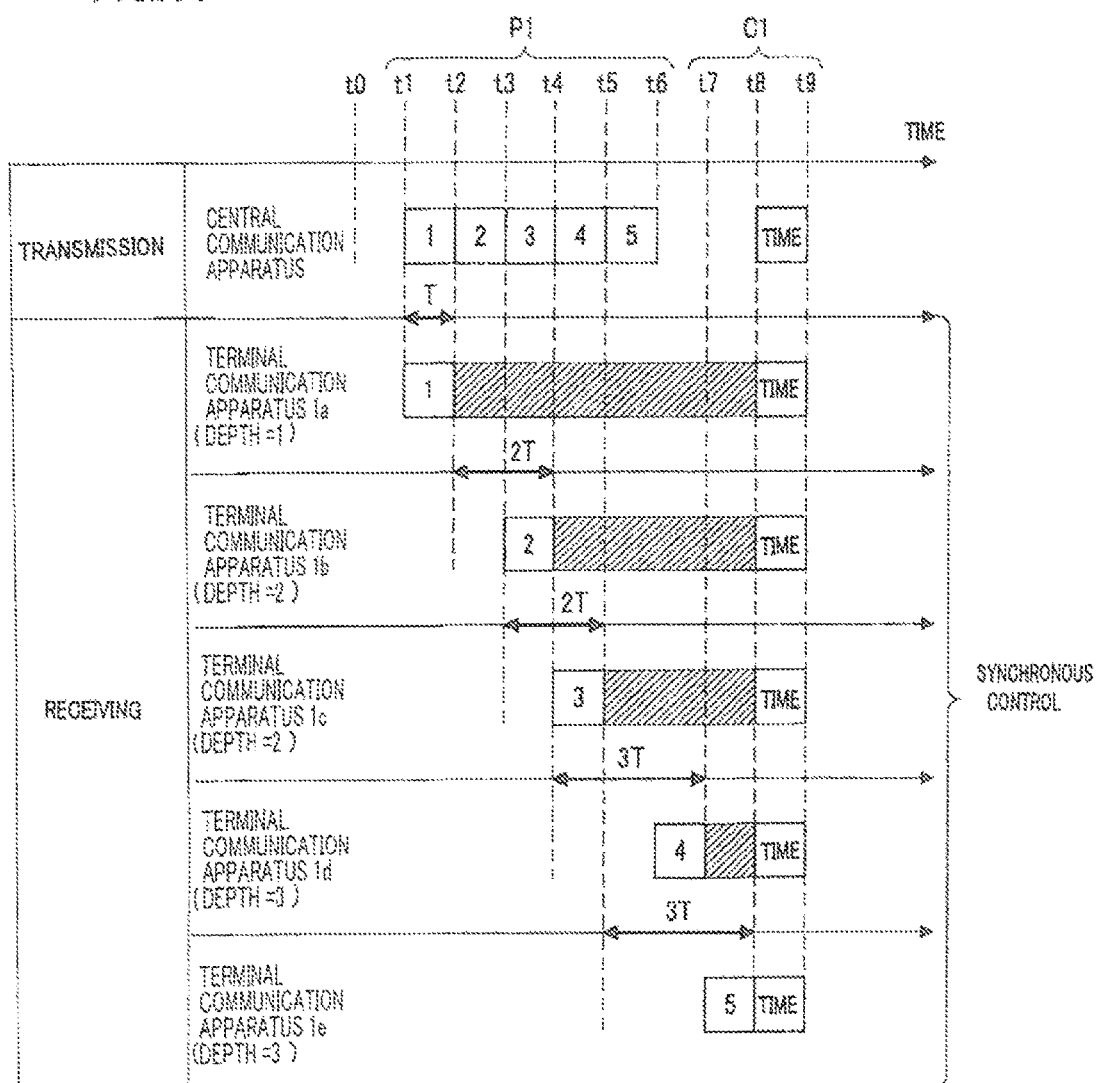
FIG. 11 is a diagram showing a communication state in a case of noting one group.

FIG. 11 is a diagram showing a communication state in a case of noting one group.

Referring to FIG. 11, the output cycle set packet "P1" in the synchronization group "1" of FIG. 10 and communication of the time adjustment packet "C1" are noted.

It is assumed that terminal communication apparatuses 1*a* to 1*e* are terminal communication apparatuses 1*a* to 1*e* in FIG. 1 and constitute one synchronization group in which the same synchronization number is stored in the synchronization number storage portions 122 respectively. In other words, the terminal communication apparatuses 1*a* to 1*e* belong to the same synchronization group. The terminal communication apparatus 1*a* is "depth=1", the terminal communication apparatuses 1*b* and 1*c* are "depth=2", and the terminal communication apparatuses 1*d* and 1*e* are "depth=3".

First, the central communication apparatus 2 transmits different output cycle set packets every T [seconds] to the respective ones of the terminal communication apparatuses 1*a* to 1*e* at timings of times t1 to t5 by normal communication control, sequentially as serial data.

The terminal communication apparatus 1*a* of "depth=1" can receive the output cycle set packet with a communication delay time "T". Therefore, the terminal communication apparatus 1*a* completely receives (accumulates) the output cycle set packet "1", beginning to be transmitted at the time t1, at the time t2 after T seconds.

The terminal communication apparatuses 1*b* and 1*c* of "depth=2" receive the output cycle set packets with a communication delay time "2T". Therefore, the terminal communication apparatus 1*b* completely receives (accumulates) the output cycle set packet "2", beginning to be transmitted at the time t2, at the time t4 after 2T seconds. Further, the terminal communication apparatus 1*c* completely receives (accumulates) the output cycle set packet "3", beginning to be transmitted at the time t3, at the time t5 after 2T seconds.

The terminal communication apparatuses 1*d* and 1*e* of "depth=3" receive the packets with a communication delay time "3T". Therefore, the terminal communication apparatus 1*d* completely receives (accumulates) the output cycle set packet "4", beginning to be transmitted at the time t4, at the time t7 after 3T seconds. Further, the terminal communication apparatus 1*e* completely receives (accumulates) the output cycle set packet "5", beginning to be transmitted at the time t5, at the time t8 after 3T seconds.

Estimating the time when receiving of the output cycle set packets completes in all terminal communication apparatuses 1, the central communication apparatus 2 transmits time adjustment packets to the terminal communication apparatuses 1*a* to 1*e* by immediate communication control.

As described in FIG. 9, the packets by the immediate communication control are received by the respective terminal communication apparatuses 1 with the same communication delay time, regardless of the depths in the network.

In other words, the terminal communication apparatuses 1*a* to 1*e* simultaneously receive the time adjustment packets ("time") transmitted from the central communication apparatus 2, and set time adjustment data stored in the time adjustment packets in the terminal time management portions 125 of themselves.

The terminal time management portions 125 adjust (generally reset) times of unillustrated timers managed by themselves according to timings at which the time adjustment data are transferred, and restart counting of the time again after lapses (waiting times) of the times for the time adjustment data.

As hereinabove described, synchronization can be performed without previously investigating communication delay times in the respective terminal communication apparatuses 1, by transferring the time adjustment packets to the respective ones of the terminal communication apparatuses 1 of the same synchronization group by immediate communication control.

Further, the distributed control system 10 according to this embodiment can perform a plurality of synchronous control operations on the same network by setting the synchronization groups.

Synchronization Group Set Screen Example

Figure 12:
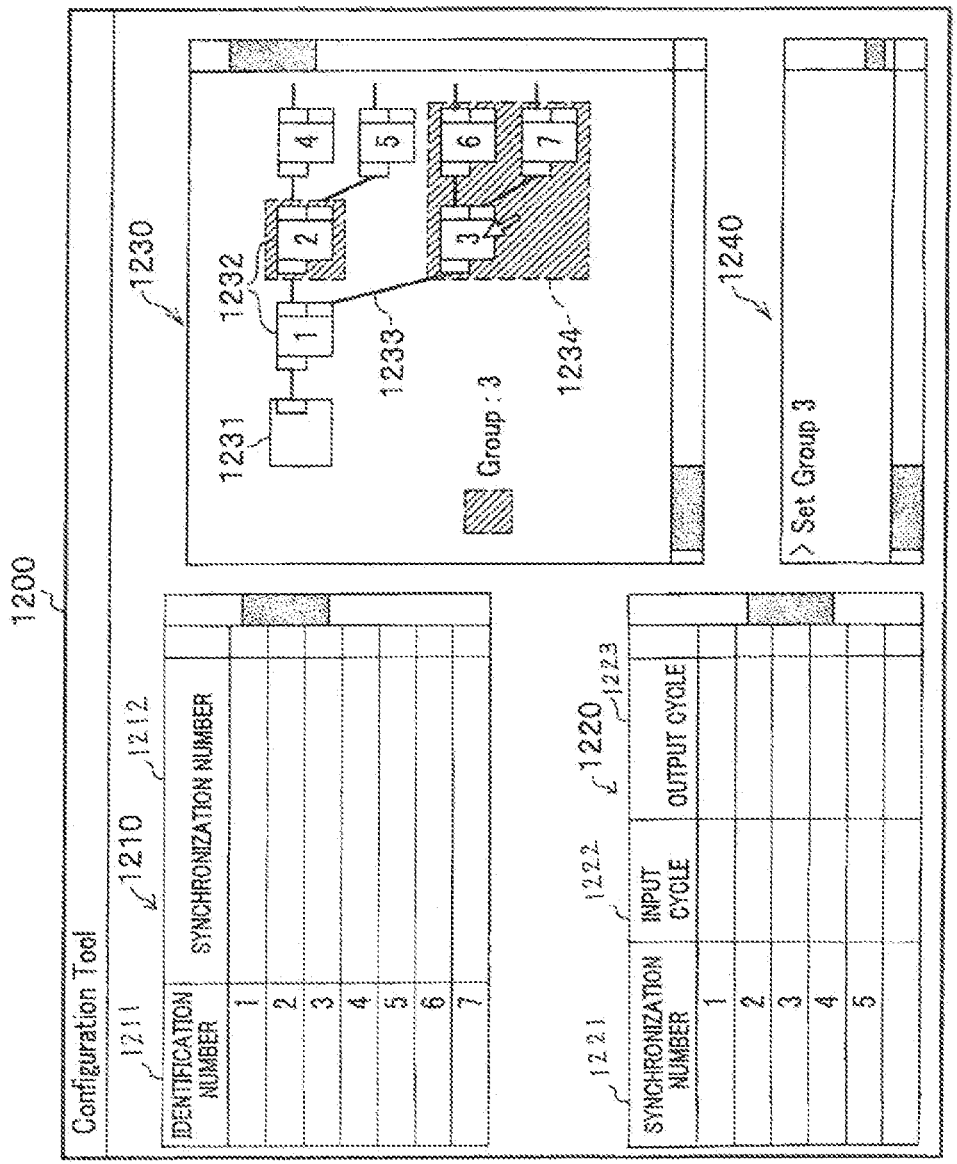
FIG. 12 is a diagram showing a set screen example of synchronization groups according to this embodiment.

FIG. 12 is a diagram showing a set screen example of synchronization groups according to this embodiment.

A synchronization group set screen 1200 of FIG. 12 is a screen displayed on the display/input unit 3 by the control software execution portion 208 (FIG. 1) of the central communication apparatus 2. The user performs setting of the cycles of input/output control information in the respective terminal communication apparatuses 1 and sets the synchronization groups through the synchronization group set screen 1200 displayed on the display/input unit 3. The synchronization group set screen shown in FIG. 10 is an example of a display screen in control support software (not shown) employing a GUI (Graphical User Interface).

The synchronization group display screen 1200 has a synchronization group set portion 1210, a synchronization performance set portion 1220, a network display portion 1230 and a process display portion 1240.

The synchronization group set portion 1210 has an identification number display portion 1211 and a synchronization number set portion 1212.

The identification number display portion 1211 is a screen for setting the synchronization groups, and displays the identification numbers of the respective terminal communication apparatuses 1.

The synchronization number set portion 1212 sets the synchronization numbers (synchronization groups) of the respective terminal communication apparatuses 1.

The synchronization performance set portion 1220 has a synchronization number set portion 1221, an input cycle set portion 1222 and an output cycle set portion 1223.

The synchronization number set portion 1221 displays the synchronization numbers set to the terminal communication apparatuses 1.

The input cycle set portion 1222 sets the input cycles of the control information set to the respective synchronization groups.

The output cycle set portion 1223 sets the output cycles of the control information set to the respective synchronization groups.

The network display portion 1230 displays a central communication apparatus symbol 1231, terminal communication apparatus symbols 1232, communication path symbols 1233 and a synchronization group symbol 1234. The identification numbers of the respective terminal communication apparatuses 1 are displayed on the terminal communication apparatus symbols 1232. The respective symbols 1231 to 1233 on the network display portion 1230 are connected by the user. When the user surrounds any terminal communication apparatus symbols 1232 with the synchronization group symbol 1234 by dragging or the like, the surrounded terminal communication apparatus symbols 1232 are set as the same synchronization group, and the result is reflected on the synchronization group set portion 1210 and the synchronization performance set portion 1220. In the example of FIG. 12, "Group: 3", i.e., the synchronization group of the synchronization number "3" is set.

A communication error state or the like may be displayed on the network display portion 1230, in addition to the network state of the distributed control system 10.

A processing status on the current synchronization group set screen is displayed on the process display portion 1240. The processing status is displayed as "Set Group 3" in the example of FIG. 12, and hence it is understood that the synchronization group of the synchronization number "3" is set on the current synchronization group set screen.

According to such a synchronization group set screen, the user can easily set a synchronization group with a plurality of terminal communication apparatuses 1.

Mounting Example

Figure 13:
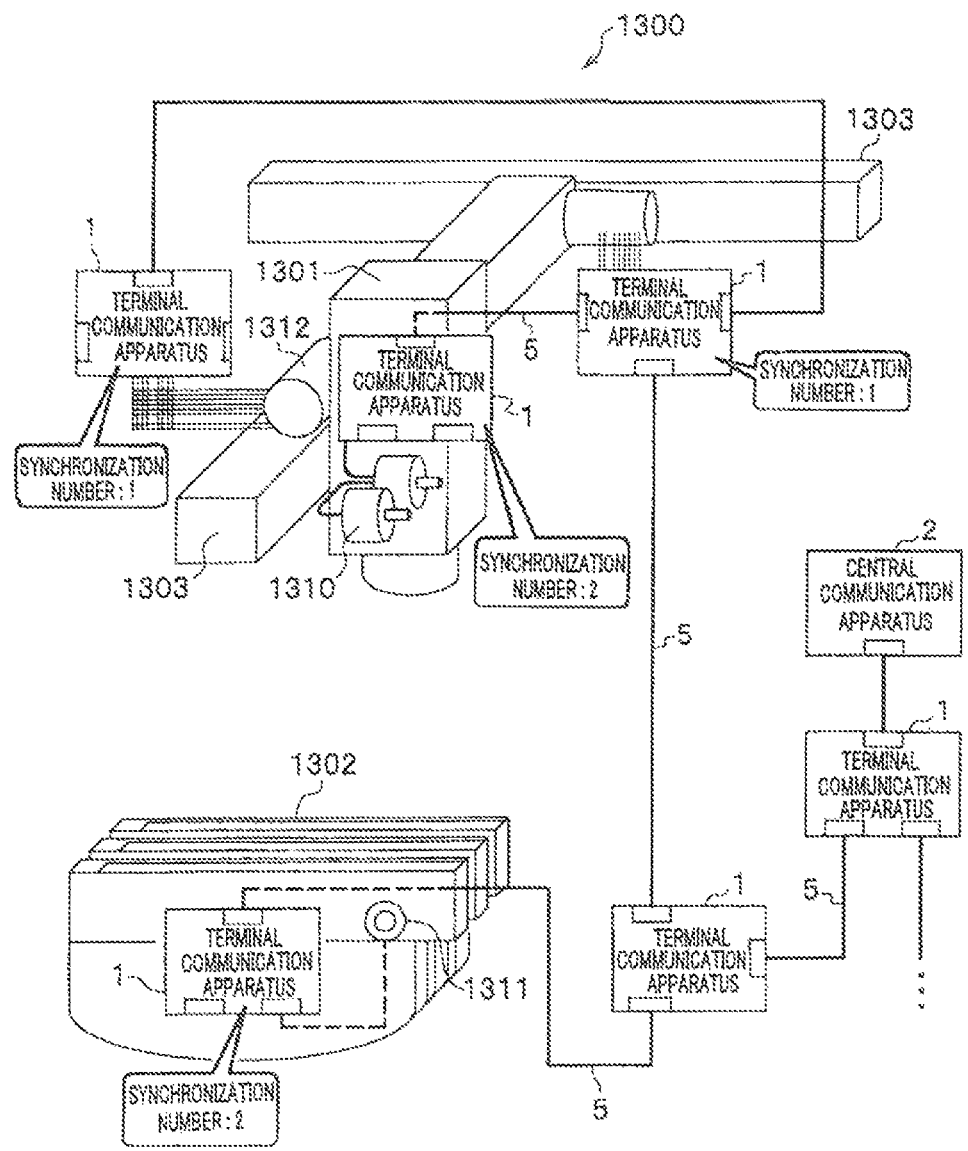
FIG. 13 is a diagram showing a mounting example of the distributed control system according to this embodiment.

FIG. 13 is a diagram showing a mounting example of the distributed control system according to this embodiment.

FIG. 13 shows an example of a structure at a time of mounting the distributed control system 10 according to this embodiment on a chip mounter which is one of industrial machines.

A chip mounter body 1300 in the chip mounter has two head portions 1301 performing adsorption/mounting of electronic components mounted on printed wiring boards, a feeder portion 1302 supplying the electronic components mounted on the printed wiring boards, beam portions 1303 moving the head portions 1301 in XY and the like.

The head portions 1301 have head driving shafts 1310 for performing component holding operations. The feeder portion 1302 has a feeder driving shaft 1311 for performing a component supply operation. Further, the respective beam portions 1303 have beam driving shafts 1312 for performing XY movements of the head portions 1301.

When applying the distributed control system 10 according to this embodiment to such a chip mounter body 1300, it follows that the chip mounter body 1300 has one central communication apparatus 2 and a plurality of terminal communication apparatuses 1. The head portions 1301 have terminal communication apparatuses 1 connected with the head driving shafts 1310. The feeder portion 1302 has a terminal communication apparatus 1 connected with the feeder driving shaft 1311. Further, the beam portions 1303 have two terminal communication apparatuses 1 connected with the respective beam driving shafts 1312. The central communication apparatus 2 and the respective terminal communication apparatuses 1 are connected with each other by the communication paths 5.

At this time, the terminal communication apparatuses in the head portions 1301 and the terminal communication apparatus 1 of the feeder portion 1302 are set as one synchronization group (synchronization number "2"), and the two terminal communication apparatuses 1 of the beam portions 1303 are set as another synchronization group (synchronization number "1"). Thus, synchronous control can be executed while guaranteeing input/output cycles of control information required by the respective synchronization groups. Therefore, the component holding operations of the head portions 1301 and the component supply operation of the feeder portion 1302 are correctly interlocked, while the XY movements of the respective beam portions 1303 are correctly interlocked at the same time.

While only the time adjustment packets are transmitted/received by immediate communication control in this embodiment, the present disclosure is not restricted to this, but packets of other types may also be transmitted/received by immediate communication control. However, at least the time adjustment packets are desirably transmitted/received by immediate communication control.

Thus, according to this embodiment, deviation between the communication delay times of the terminal communication apparatuses resulting from hierarchical relation of the network can be eliminated, and synchronous control exhibiting high simultaneity can be easily implemented without considering a network connection mode.

According to this embodiment, synchronization can be enabled without previously investigating delay communication times, by employing immediate communication control of sequentially transmitting packets received as serial data.

According to this embodiment, synchronization can be enabled while keeping reliability without previously investigating delay communication times as described above, by rendering immediate communication control switchable to normal communication control which is highly reliable normal communication control.

According to this embodiment, further, synchronous control is so grouped that setting of input/output cycles of control information and adjustment of times are possible for respective groups, whereby synchronous control according to input/output cycles of a plurality of control information data is implemented on one network, and the input/output cycle of control information required to each synchronous control can be further correctly guaranteed.

Programs stored in an unillustrated ROM (Read Only Memory) or an HD (Hard Disk) are developed in a RAM (Random Access Memory) and run by a CPU (Central Processing Unit), thereby embodying the respective portions 201, 202 and 204 to 208 of the central communication apparatus 2.

Further, programs stored in the unillustrated ROM are developed in the RAM and run by the CPU, thereby embodying the terminal communication control portions 110 and the respective portions 111, 112, 125 and 126 of the terminal communication apparatuses 2.

The present disclosure is not restricted to the aforementioned embodiment, but various modifications are included. For example, the aforementioned embodiment has been described in detail in order to intelligibly illustrate the present disclosure, and is not necessarily limited to having all described structures. As to part of the structure of each embodiment, it is possible to perform addition/deletion/replacement of other structures.

The aforementioned respective structures, functions, the respective portions 110, 111, 112, 125, 126, 201, 202 and 204 to 208, the respective storage portions 203, 121 to 124 and 127 and the like may be partially or entirely designed by an integrated circuit, for example, to be implemented by hardware. Further, a processor such as a CPU may interpret and run programs implementing the respective functions, thereby implementing the aforementioned respective structures, functions etc. to be implemented by software. Information of the programs, tables, files and the like implementing the respective functions can be stored in a recording unit such as a memory or an SSD (Solid State Drive) or a recording medium such as an IC (Integrated Circuit) card, an SD (Secure Digital) card or a DVD (Digital Versatile Disc), in addition to storage in the HD.

Each embodiment shows control lines and information lines conceivably necessary for illustration, and not necessarily shows all control lines and information lines on products. In practice, almost all structures may be considered as being mutually connected.

What is claimed is:

1. A terminal communication apparatus comprising:
an integrated circuit or a processor configured to store one or more programs, the one or more programs comprising instructions for:
a terminal communication control portion, and
a terminal time management portion,
wherein the terminal communication control portion includes:
an immediate communication control portion sequentially transmitting serial data to another terminal communication apparatus bitwise when receiving data of a prescribed length as bitwise serial data, and
a normal communication control portion performing processing on the data after accumulating the serial data until the serial data reaches the prescribed length when receiving the prescribed length as bitwise serial data, the terminal communication control portion being configured for performing
processing with the immediate communication control portion in a case of receiving first data which is data of the prescribed length at least containing time adjustment data posting a timing of synchronization in the other terminal communication apparatus, and performing processing with the normal communication control portion in a case of receiving second data which is data of the prescribed length other than the first data, and
wherein the terminal time management portion being configured for performing synchronization by performing adjusting times of timers in response to receiving the time adjustment data from the immediate communication control portion in case the immediate communication control portion determines received first data is addressed to a synchronization group to which the terminal communication apparatus belongs.

2. The terminal communication apparatus according to claim 1, wherein
information as to whether to perform the processing with the immediate communication control portion or to perform the processing with the normal communication control portion is stored in the head of the data of the prescribed length, and
the terminal communication control portion determines whether to perform the processing with the immediate communication control portion or to perform the processing with the normal communication control portion on the basis of information as to whether to perform the processing with the immediate communication control portion or to perform the processing with the normal communication control portion when receiving the serial data of the head.

3. The terminal communication apparatus according to claim 2, wherein
the information as to whether to perform the processing with the immediate communication control portion or to perform the processing with the normal communication control portion is stored in the headmost one bit of the data of the prescribed length.

4. A distributed control system comprising:
a plurality of terminal communication apparatuses performing control of control object devices and a central communication apparatus performing control of the terminal communication apparatuses, wherein a synchronization group which is a group performing the synchronization at the same timing is set to each terminal communication apparatus,
wherein each of the terminal communication apparatuses includes:
a terminal communication control portion, and
a terminal time management portion,
wherein the terminal communication control portion includes:
an immediate communication control portion sequentially transmitting serial data to another terminal communication apparatus bitwise when receiving data of a prescribed length as bitwise serial data, and
a normal communication control portion performing processing on the data after accumulating the serial data until the serial data reaches the prescribed length when receiving the prescribed length as the bitwise serial data,
the terminal communication control portion being configured for performing processing with the immediate communication control portion in a case of receiving first data which is data of the prescribed length at least containing time adjustment data posting a timing of synchronization in the other terminal communication apparatus, and performing processing with the normal communication control portion in a case of receiving second data which is data of the prescribed length other than the first data, and
wherein the terminal time management portion being configured for performing synchronization by performing adjusting times of timers in response to receiving the time adjustment data from the immediate communication control portion in case the immediate communication control portion determines received first data is addressed to the synchronization group to which the terminal communication apparatus belongs.

5. A non-transitory computer-readable storage medium storing one or more programs, the one or more programs for execution by one or more processors of a computer system, the one or more programs comprising instructions for:
a terminal communication control portion, and
a terminal time management portion,
wherein the terminal communication control portion includes:
an immediate communication control portion sequentially transmitting serial data to another terminal communication apparatus bitwise when receiving data of a prescribed length as bitwise serial data, and
a normal communication control portion performing processing on the data after accumulating the serial data until the serial data reaches the prescribed length when receiving the prescribed length as bitwise serial data,
the terminal communication control portion being configured for performing processing with the immediate communication control portion in a case of receiving first data which is data of the prescribed length at least containing time adjustment data posting a timing of synchronization in the other terminal communication apparatus, and performing processing with the normal communication control portion in a case of receiving second data which is data of the prescribed length other than the first data, and
wherein the terminal time management portion being configured for performing synchronization by performing adjusting times of timers in response to receiving the time adjustment data from the immediate communication control portion in case the immediate communication control portion determines received first data is addressed to a synchronization group to which the terminal communication apparatus belongs.

* * * * *